United States Patent Office 3,234,254
Patented Feb. 8, 1966

3,234,254
PROCESS FOR PREPARING AROMATIC
DIISOTHIOCYANATES
Alfons Söder and Georg Lämmler, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 6, 1961, Ser. No. 136,176
Claims priority, application Germany, Sept. 15, 1960, F 32,127; Oct. 22, 1960, F 32,391; Aug. 18, 1961, F 34,721
13 Claims. (Cl. 260—454)

The present invention relates to the preparation of aromatic diisothiocyanates by reacting primary aromatic diamines in order to obtain bis-dithiocarbamic acids and converting the latter into diisothiocyanates.

It is already known that phenylene-diisothiocyanate-(1,4) can be obtained by reacting phenylene-diamine-(1,4) with thiophosgene (compare "Berichte der Deutschen Chemischen Gesellschaft," volume 20 (1887), page 230), by splitting polymeric p-phenylene-thiourea by means of acetic anhydride (compare "Journal of the American Chemical Society," volume 45 (1923), page 2354), or by reacting the diammonium salt of the phenylene-bis-dithiocarbamic acid with iron salts (compare German patent specification 700,436). The above-mentioned processes are, however, not well suitable for the preparation of aromatic diisothiocyanates on an industrial scale. Furthermore, there are known processes for converting aromatic monoamines into monoisothiocyanates (compare Houben-Weyl, "Methoden der organischen Chemie," 4th edition, volume 9, pages 867 et seq.). It is, however, not possible to adapt said processes directly to the diisothiocyanate series. With analogous operation, the yields of the last-mentioned compounds are often very low since the monodithiocarbamic acids present as intermediate products precipitate because of their being sparingly soluble and, therefore, withdraw from further reaction. When starting from benzidine, there is obtained in a great number of solvents, such as methanol, acetone and pyridine, the monodithiocarbamate nearly exclusively. Moreover, the products obtained in a small yield are contaminated by large amounts of mono compounds that may be separated with difficulties only. A purification by recrystallization if possible at all, proceeds with great losses because of the thermal instability.

When preparing from the difficultly accessible bisdithiocarbamic acids pure aromatic diisothiocyanates suitable, for instance, for human medicine, further difficulties are encountered due to fastly adhering impurities such as sulfur, sulfur containing by-products and a small amount of unknown dyestuffs which cannot be separated without considerable losses, neither by further recrystallization from a great number of solvents nor by chromotographic processes.

Now we have found that aromatic diisothiocyanates can be prepared in a good yield by dissolving aromatic primary diamines in dimethylformamide, reacting them with ammonia and carbon disulfide, subjecting the ammonium salts of the aryl-bis-dithiocarbamic acids thus obtained or salts obtainable thereof by reaction with other bases to the action of alkali metal chlorites and treating the products thus obtained with formic acid methyl ester. Generally, the crystalline bis-dithiocarbamates obtained as intermediate products contain dimethylformamide in their crystal lattice.

As starting substances for the process according to the invention there enter into consideration diamines of aromatic compounds containing one or several rings, the individual rings being linked directly or over alkylene groups or being anellated. As typical representatives there may be mentioned, for instance, the phenylene and naphthylene diamines, benzidines and similar compounds as well as compounds of the type of the diamino-diphenyl methanes. The above-mentioned compounds may be substituted, on their part, by halogen, alkoxy and/or alkyl groups. As examples be mentioned in this connection 2-chlorophenylene-diamine-(1,4), 2-methoxy-phenylene diamine-(1,4), 2,6-dichlorophenylene-diamine-(1,4) and 2,5-dimethylphenylene-diamine-(1,4).

The process according to the invention is appropriately realized in such a way that the aromatic primary diamine is dissolved in dimethylformamide, ammonia is added, if desired in aqueous solution, and the whole is reacted with carbon disulfide. In order to render the reaction as complete as possible there must be used 2 mols of ammonia and 2 mols of carbon disulfide each per mol of diamine. It is of advantage to use these reactants in excessive amounts; generally, there will be used for economic reasons about 2 to 6 mols of ammonia and 2 to 3 mols of carbon disulfide per mol of diamine. The temperature may vary within large limits. Considering the thermal liability of the bis-dithiocarbamates mentioned above, low operation temperatures should be preferred, for instance the room temperature, since it is not to be feared that the monodithiocarbamates precipitate from the reaction solution.

In most cases the ammonium salts of the bis-dithiocarbamates crystallize directly from the reaction mixture and are isolated according to known methods, for instance by suction filtering. The purity of the salts obtained can be seen, among others, for instance by their good solubility in water. The products obtained according to methods hitherto known, however, are only partly dissolved because of the impurities caused by monodithiocarbamates. If desired, the ammonium salts obtained may be converted into other basic salts. In addition to the ammonium salts directly obtained, there may likewise be used for the further reaction other basic salts such as substituted ammonium salts, for instance triethyl ammonium salts and alkali metal salts, especially sodium and potassium salts.

As reaction component for the bis-dithiocarbamates there can be used alkali metal chlorites, preferably sodium or potassium chlorite. In order to convert the bis-dithiocarbamates into diisothiocyanates it is suitable to stir into the aqueous solution of a salt of a bis-dithiocarbamic acid obtained in the manner described above an aqueous solution of an alkali metal chlorite. In this connection it is advisable to use a concentrated chlorite solution, for instance a solution of 20 to 40% strength. The forming precipitate is separated off, after drying the diisothiocyanate is dissolved in formic acid methyl ester, the solution is freed from insoluble parts, for instance by filtration, clarified, if necessary, and concentrated until crystallization sets in. It is unnecessary to add to the reaction medium any organic solvent.

Naturally, the yields obtainable in the second reaction phase depend upon the reaction conditions applied. Temperatures between −15 and +30° C., preferably between −5 and +12° C., proved to be most advantageous. Although the reaction according to the invention can likewise be carried out with the calculated amount of chlorite better yields are obtained by using an excessive amount thereof, preferably of 2 to 3 mols.

For clarifying the solutions of the products obtained according to the invention, it is of advantage to use a clarifying agent, for instance decolorizing carbon or charcoal.

In comparison with the above-mentioned known methods of preparing diisothiocyanates, the process of the present invention is distinguished by the fact that it gives in nearly quantitative yield pure products which can directly be used for pharmaceutical purposes. The surprising criterion of the present invention is to be seen in that the reaction of aromatic diamines with carbon disulfide in dimethylformamide takes a smooth course and that pure products can be prepared with the aid of formic acid methyl ester.

The products obtained by the process of the present invention are characterized by their action on a great number of members of the families of hook worms, tape worms, ascaris lumbricoides and oesophagostomum and by their low toxicity. Upon conversion into suitable galenic preparations they can be used for combatting parasitic helminthes.

The following examples serve to illustrate the invention but they are not intended to limit it thereto.

EXAMPLE 1

*Phenylene-diisothiocyanate-(1,4)*

(a) 108 grams (1 mol) of phenylene-diamine-(1,4) are dissolved in 2500 cc. of dimethylformamide. 272 cc. of an aqueous ammonia solution of 25% strength (4 mols) are then added and the solution is cooled to +8° C. 170 cc. (3 mols) of carbon disulfide are added while stirring within 30 minutes. The reaction and crystallization heat is eliminated by means of an icewater bath so that the temperature in the reaction mixture does not exceed 25° C. Crystallization starts when about half the amount of carbon disulfide has dropped in. Upon addition of the carbon disulfide the mixture is stirred for 1 hour while being cooled with icewater, and then again for 4 hours, without cooling, until the crystallization is achieved.

The light-yellow, wedge-shaped crystals which in most cases are agglomerated, are collected on a suction filter of porcelain and freed from adhering mother liquor by means of acetone. The crystallized product contains 4 mols of dimethyl-formamide/mol.

The yield of air-dry diammonium salt of the phenylene-bis-dithiocarbamic acid-(1,4) amounts to 573 grams (97.5% of the theory).

The crystals dissolve at 20° C. clearly in 6 parts of water and melt at 102 to 104° C.

*Analysis.*—$C_8H_{14}N_4S_4 \cdot 4C_3H_7NO$ ($C_{20}H_{42}N_8O_4S_4$, 586,840) calculated: 40.93% C, 7.21% H, 19.10% N, 21.85% S. Found: 40.70% C, 7.40% H, 18.92% N, 21.56% S.

(b) 586.8 grams (1 mol) of the diammonium salt of the phenylene-bis-dithiocarbamic acid-(1,4) containing 4 mols of crystalline dimethylformamide are dissolved in 4000 cc. of distilled water. 520 cc. of an aqueous sodium chlorite solution of 35% strength are then added at +10° C. while stirring. The precipitate formed is then separated by centrifugation, washed with water and centrifuged to dryness. The crude phenylene-diisothiocyanate-(1,4) obtained which is contaminated by sulfur is dried at 40° C. in the vacuum drying cabinet, dissolved in formic acid methyl ester, freed from undissolved parts by filtration, the solution is clarified by means of charcoal and concentrated until crystallization sets in. There are thus obtained 175 grams (91% of the theory) of pure phenylene-diisothiocyanate-(1,4). The melting point of the preparation amounts to 130° C.

*Analysis.*—$C_8H_4N_2S_2$ (192,248) calculated: 49.98% C, 2.10% H, 14.57% N, 33.35 S. Found: 50.01% C, 2.21% H, 14.39% N, 33.44% S.

In a manner analogous to that described in Example 1, there are obtained from phenylenediamine-(1,3) the phenylene-diisothiocyanate-(1,3) having a melting point of 53° C., from 2-chlorophenylene-diamine-(1,4) the 2-chlorophenylene-diisothiocyanate-(1,4) having a melting point of 59 to 60° C., from 2-methoxyphenylene-diamine-(1,4) the 2 - methoxy-phenylene-diisothiocyanate-(1,4) having a melting point of 100° C. and from 2,6-dichloro-phenylenediamine-(1,4) the 2,6-dichloro-phenylene-diisothiocyanate-(1,4) having a melting point of 106° C., and from 2,5-dimethylphenylene-diamine-(1,4) the 2,5-dimethylphenylene-diisothiocyanate-(1,4) having a melting point of 107 to 110° C. in yields between 80 and 90% of the theory.

EXAMPLE 2

*Naphthylene-diisothiocyanate-(1,4)*

(a) 25.6 grams (0.1 mol) of 1,4-diamino-naphthalene-sulfate and 50 cc. of an aqueous ammonia solution of 25% strength are introduced, while stirring, into 200 cc. of dimethyl-formamide. After about 30 minutes the solution is separated from precipitated ammonium sulfate crystals. The crystals are washed out with 20 cc. of dimethyl-formamide. The washing liquid is combined with the solution. After addition of 17 cc. of carbon disulfide the dimethylformamide addition product of the diammonium salt of naphthylene-bis-dithiocarbamic acid-(1,4) (4 mols/mol) soon crystallizes out in the form of light-yellow, rectangular platelets. During the reaction the temperature should not exceed 25° C. After about three hours the crystallization is finished. The isolated substance is washed again with acetone. At 97 to 98° C. the crystals considerably sinter. Above this temperature decomposition slowly sets in.

The yield of air-dry substance amounts to 54.0 grams (85% of the theory). The solubility in water at 20° C. amounts to 1 gram in 4.6 milliliters of water.

*Analysis.*—$C_{12}H_{16}N_4S_4 \cdot 4C_3H_7NO$ ($C_{24}H_{44}N_8O_4S_4$, 636,896) calculated: 45.26% C, 6.96% H, 17.60% N, 20.13% S. Found: 45.10% C, 7.24% H, 17.48% N, 20.31% S.

(b) In a manner analogous to that described in Example 1b 63.7 grams (1/10 mol) of the diammonium salt of naphthylene-bis-bithiocarbamic acid-(1,4), containing 4/10 mol of crystalline dimethylformamide, in aqueous solution are reacted at 0° C. with 2/10 mol of a sodium chlorite solution of 35% strength. From formic acid methyl ester there are obtained 22.5 grams (93% of the theory) of pure crystalline naphthylene-diisothiocyanate-(1,4) of a melting point of 122° C.

*Analysis.*—$C_{12}H_6N_2S_2$ (242,304) calculated: 59.48% C, 2.50% H, 11.56% N, 26.46% S. Found: 59.61% C, 2.63% H, 11.59% N, 26.66% S.

EXAMPLE 3

*Diphenylene-diisothiocyanate-(4,4′)*

(a) In a manner analogous to that described in Example 1a 18.4 grams (0.1 mol) of benzidine, 27 cc. of an aqueous ammonia solution of 25% strength and 17 cc. of carbon disulfide in 63 cc. of dimethylformamide are reacted. The crystallization of the dimethylformamide addition product in the form of aggregates resembling to wheat grains soon starts. The light-yellow crystals are separated off after about 5 hours and washed with acetone. Yield of air-dry substance: 47.5 grams (92% of the theory) melting point: 93° C. with decomposition.

1 gram of the diammonium salt of diphenylene-bis-dithiocarbamic acid - (4,4′) - dimethylformamide addition product dissolves in 20 cc. of water at 20° C.

*Analysis.*—$C_{14}H_{18}N_4S_4 \cdot 2C_3H_7NO$ ($C_{20}H_{32}N_6S_4O_2$, 516,744) calculated: 46.48% C, 6.24% H, 16.27% N, 24.82% S. Found: 46.66% C, 6.17% H, 15.98% N, 24.54% S.

(b) By reaction of an aqueous solution of 51.7 grams (1/10 mol) of the diammonium salt of the diphenylene-bis-dithiocarbamic acid-(4,4′) containing 2/10 mol of crystalline dimethylformamide, in 1000 cc. of distilled water are reacted at +5° C. with 65 cc. of an aqueous sodium chlorite solution of 35% strength, a light-grey precipitate is obtained. After separation of the sulfur as described in Example 1b there are obtained 24.2 grams (90% of the theory) of crystalline diphenylene-diisothiocyanate-(4,4′). The substance melts at 205° C.

*Analysis.*—$C_{14}H_8N_2S_2$ (268,340) calculated: 62.66% C, 3.00% H, 10.44% N, 23.9% S. Found: 62.53% C, 3.05% H, 10.71% N, 24.02% S.

We claim:
1. A process for the manufacture of aromatic diisothiocyanates which comprises (A) reacting an aromatic primary diamine dissolved in dimethylformamide with at least two mols of ammonia and at least two mols of carbon disulfide per mol of diamine at a temperature up to 25° C. to form the corresponding bis-ammonium dithiocarbamate, (B) reacting said bis-ammonium dithiocarbamate in aqueous solution and at a temperature between −15° C. and +30° C. with a chlorite selected from the group consisting of sodium chlorite and potassium chlorite, and (C) purifying the crude aromatic diisothiocyanate thus obtained by recrystallizing it from formic acid methyl ester.

2. A process as claimed in claim 1, wherein the ammonium-bis-dithiocarbamate is converted into a salt selected from the group consisting of alkali metal and triethylammonium salts by converting the ammonium salt to a member selected from the group consisting of the corresponding alkali metal salt and triethyl ammonium salt, the salt thus obtained is subsequently treated as set forth in claim 1.

3. A process as defined in claim 1, wherein the aromatic primary diamine is selected from the group consisting of phenylene diamine, naphthylenediamine, benzidine, diamino-diphenyl-methane, chloro-phenylene-diamine, lower alkyl-phenylene-diamine and lower alkoxy-phenylenediamine.

4. A process as defined in claim 1, wherein said aromatic primary diamine is p-phenylene-diamine.

5. A process as defined in claim 1, wherein said aromatic primary diamine is m-phenylene-diamine.

6. A process as defined in claim 1, wherein said aromatic primary diamine is 2-chloro-1,4-diaminobenzene.

7. A process as defined in claim 1, wherein said aromatic primary diamine is 2-methoxy-1,4-diaminobenzene.

8. A process as defined in claim 1, wherein said aromatic primary diamine is 2,6-dichloro-1,4-diaminobenzene.

9. A process as defined in claim 1, wherein said aromatic primary diamine is 2,5-dimethyl-1,4-diaminobenzene.

10. A process as defined in claim 1, wherein said aromatic primary diamine is 1,4-diaminonaphthylene.

11. A process as defined in claim 1, wherein said aromatic primary diamine is 4,4′-diaminodiphenyl.

12. A process as defined in claim 1, wherein the chlorite reactant in step B is sodium chlorite.

13. A process as defined in claim 1, wherein the temperature in step B is between −5 and +12° C.

References Cited by the Examiner
UNITED STATES PATENTS

| | | | |
|---|---|---|---|
| 2,374,136 | 4/1945 | Rothrock | 260—454 XR |
| 2,511,310 | 6/1950 | Upson | 260—454 XR |
| 2,859,235 | 11/1958 | Schmidt et al. | 260—454 |
| 2,943,106 | 6/1960 | McKay et al. | 260—454 |
| 3,111,536 | 11/1963 | Tarlton et al. | 260—454 |

FOREIGN PATENTS 353,871    4/1930    Great Britain.

CHARLES B. PARKER, *Primary Examiner.*

MORRIS O. WOLK, *Examiner.*